United States Patent
Pandurangan et al.

(10) Patent No.: US 9,733,628 B2
(45) Date of Patent: *Aug. 15, 2017

(54) SYSTEM AND METHOD FOR ADVANCED PROCESS CONTROL

(71) Applicant: HONEYWELL INTERNATIONAL INC., Morristown, NJ (US)

(72) Inventors: Gobinath Pandurangan, Karnataka (IN); Kishen Manjunath, Karnataka (IN); Sanjay Kantilal Dave, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 464 days.

This patent is subject to a terminal disclaimer.

(21) Appl. No.: 14/459,041

(22) Filed: Aug. 13, 2014

(65) Prior Publication Data

US 2016/0048113 A1   Feb. 18, 2016

(51) Int. Cl.
| | |
|---|---|
| G05B 13/02 | (2006.01) |
| G05B 13/04 | (2006.01) |
| G05B 17/02 | (2006.01) |
| G05B 23/02 | (2006.01) |

(52) U.S. Cl.
CPC ............. *G05B 13/04* (2013.01); *G05B 17/02* (2013.01); *G05B 23/0243* (2013.01); *G05B 2219/14016* (2013.01); *G05B 2219/14126* (2013.01); *G05B 2219/37325* (2013.01); *G05B 2219/42318* (2013.01); *G05B 2219/45071* (2013.01)

(58) Field of Classification Search
None
See application file for complete search history.

(56) References Cited

U.S. PATENT DOCUMENTS

| | | | |
|---|---|---|---|
| 6,263,255 B1 * | 7/2001 | Tan | G05B 19/41845 |
| | | | 700/106 |
| 6,850,811 B1 | 2/2005 | Stewart | |
| 9,235,657 B1 * | 1/2016 | Wenzel | G05B 13/0265 |
| 9,436,179 B1 * | 9/2016 | Turney | G05B 23/02 |

(Continued)

FOREIGN PATENT DOCUMENTS

JP    2012230701    11/2012

OTHER PUBLICATIONS

Dennis Brandl, "Advanced process control in the cloud", Control Engineering, www.controleng.com, Feb. 22, 2013.

*Primary Examiner* — Adam Lee
(74) *Attorney, Agent, or Firm* — Jetter & Associates, P.A.

(57) ABSTRACT

A system and method for performing management and diagnostic functions in an advanced process control (APC) system. An APC management computer retrieves operating process data from an APC control computer and performs an iterative step test on the APC system. The iterative step test modifies at least one test parameter of the operating process data and identifies changes to a set of remaining parameters of the operating process data resulting from modification of the test parameter. The APC management computer determines at least one process variable from the iterative step test and generates at least one process model based on the process variable. The APC management computer transmits the process model to the APC control computer.

17 Claims, 8 Drawing Sheets

(56) References Cited

U.S. PATENT DOCUMENTS

| | | | |
|---|---|---|---|
| 2003/0129774 A1* | 7/2003 | Christian | H01L 21/7684 438/10 |
| 2004/0117766 A1* | 6/2004 | Mehta | G05B 11/32 717/121 |
| 2006/0271225 A1* | 11/2006 | Schulze | G05B 13/048 700/108 |
| 2007/0055402 A1* | 3/2007 | Guez | G05B 13/042 700/104 |
| 2008/0103748 A1* | 5/2008 | Axelrud | G05B 13/048 703/12 |
| 2010/0138004 A1 | 6/2010 | Chia et al. | |
| 2010/0312374 A1* | 12/2010 | Tsai | G01R 31/2894 700/110 |
| 2011/0040399 A1 | 2/2011 | Lu | |
| 2011/0213478 A1 | 9/2011 | Tsen et al. | |
| 2011/0301736 A1* | 12/2011 | Tsai | G05B 17/02 700/104 |
| 2012/0049881 A1* | 3/2012 | Johnson | G01R 31/2894 324/762.01 |
| 2012/0109620 A1* | 5/2012 | Gaikwad | G05B 13/048 703/21 |
| 2012/0131172 A1 | 5/2012 | Falk et al. | |
| 2012/0197616 A1* | 8/2012 | Trnka | G05B 17/02 703/6 |
| 2012/0323367 A1* | 12/2012 | MacArthur | G05B 13/048 700/267 |
| 2013/0060354 A1* | 3/2013 | Choi | G05B 19/41875 700/51 |
| 2013/0110276 A1* | 5/2013 | Cheng | G06F 17/5063 700/121 |
| 2013/0282146 A1* | 10/2013 | Lu | G05B 19/042 700/29 |
| 2015/0253749 A1* | 9/2015 | Kniazev | G05B 13/048 700/29 |
| 2015/0275785 A1* | 10/2015 | Cygan, Jr. | F01L 1/34409 701/102 |
| 2016/0041536 A1* | 2/2016 | Benosman | G05B 13/048 700/31 |
| 2016/0048112 A1* | 2/2016 | Pandurangan | G05B 13/04 700/30 |

* cited by examiner

SYSTEM AND METHOD FOR ADVANCED PROCESS CONTROL

FIELD

Disclosed embodiments relate to computers used with industrial hardware devices and more specifically relate to performing management and diagnostic functions in an advanced process control system.

BACKGROUND

Processing facilities are often managed using process control systems. Processing facilities can include manufacturing plants, chemical plants, crude oil refineries, ore processing plants, and paper or pulp manufacturing plants. These industries typically use continuous processes and fluid processing. Process control systems typically manage the use of motors, valves, sensors, gauges and other industrial equipment in the processing facilities.

Advanced process control refers to a range of techniques and technologies implemented within industrial process control systems. Advanced process controls are usually deployed in addition to basic process controls. Basic process controls are designed and built with the process itself, to facilitate basic operation, control and automation requirements.

For example, one known advanced process control technique is multivariable model predictive control (MPC). MPC identifies independent and dependent process variables and the dynamic relationships between them, and uses matrix-math based control and optimization algorithms to control multiple variables simultaneously.

SUMMARY

This summary is provided to introduce a brief selection of disclosed concepts in a simplified form that are further described below in the Detailed Description including the drawings provided. This Summary is not intended to limit the claimed subject matter's scope.

Disclosed embodiments recognize advanced process control (APC) engineering is generally an involved and an expert task, and with the increase in the install base of APC controllers and generally a scarcity of APC engineers, there is a need for effectively using the APC engineers' time, thus, the need to reduce travel time and enable remote capabilities. In the industry too, there is a drive for centralizing things for easy maintenance and effective control—unit level centralization to plant level centralization for effective use of manpower and tools. Moreover, process control diagnostics and maintenance is becoming a service business along with it comes the need for secure data transfer.

Known model files for APC which generally involve process tuning with proportional-integral-derivative (PID) controllers lack a maintenance history available in a context, which leads to significant effort from the Engineer to figure out the problem, sometimes reinventing the same solution several times. Disclosed embodiments solve this problem by separating responsibility between APC Control and APC Management, where the control layer capabilities are pushed to L2 with operator functions at L3 (a different level), and further include a maintenance record of APC control, asset health data and other information, which enables more efficient and better engineering process diagnostics to be provided.

Disclosed embodiments comprise a method of performing management and diagnostic functions in an APC system. The method includes providing an APC management computer communicatively coupled by a communication device to an APC control computer. The APC management computer includes a processor connected to a storage device having a non-transitory machine-readable storage medium storing a data collection module and a step testing module. The APC management computer is programmed to implement the data collection module and the step testing module causing the APC management computer to retrieve operating process data from the APC control computer and perform an iterative step test on the APC system. The iterative step test modifies at least one test parameter of the operating process data and identifies changes to a set of remaining parameters of the operating process data resulting from modification of the test parameter. The APC management computer determines at least one process variable from the iterative step test and generates at least one process model based on the process variable. The process model is transmitted to the APC control computer.

One disclosed embodiment comprises a system for performing management and diagnostic functions in an APC environment. The system includes an APC management computer communicatively coupled by a communication device to an APC control computer. The APC management computer includes a processor connected to a storage device having a non-transitory machine-readable storage medium storing a data collection module and a step testing module. The APC management computer is programmed to implement the data collection module and the step testing module causing the APC management computer to retrieve operating process data from the APC control computer and perform an iterative step test on the APC environment. The iterative step test modifies at least one test parameter of the operating process data and identifies changes to a set of remaining parameters of the operating process data resulting from modification of the test parameter. The APC management computer determines at least one process variable from the iterative step test and generates at least one process model based on the process variable. The APC management computer transmits the process model to the APC control computer.

DETAILED DESCRIPTION

Figure 1:
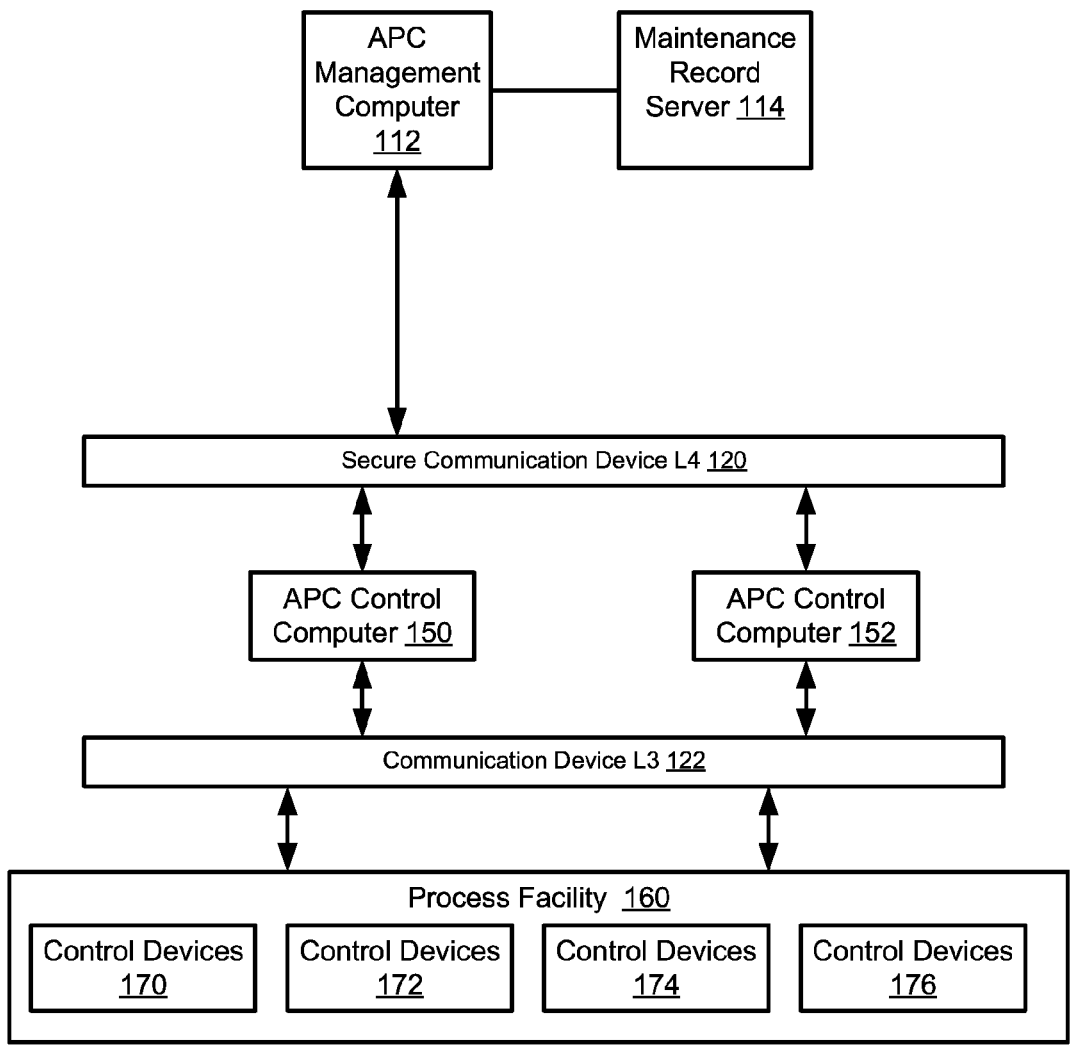
FIG. 1 is a block diagram of an example APC system, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments provide a method, system and computer program product for performing management and diagnostic functions in an APC system. In accordance with a disclosed embodiment, an APC management computer is communicatively coupled by a communication device to an APC control computer. The APC management computer includes a processor connected to a storage device having a non-transitory machine-readable storage medium storing a data collection module and a step testing module. The APC management computer is programmed to implement the data collection module and the step testing module causing the APC management computer to retrieve operating process data from the APC control computer and perform an iterative step test on the APC environment. The iterative step test modifies at least one test parameter of the operating process data and identifies changes to a set of remaining parameters of the operating process data resulting from modification of the test parameter. The APC management computer determines at least one process variable from the iterative step test and generates at least one process model based on the process variable. The APC management computer transmits the process model to the APC control computer.

FIG. 1 illustrates a block diagram of an example APC system 100. As shown in FIG. 1, APC system 100 comprises APC management computer 112 that is in communication with one or more APC control computers 150 and 152 via a secure communication device L4 120. Secure communication device L4 120 can securely transmit and receive encrypted communications. The APC management computer 112 can be connected or networked to additional APC control computers. APC management computer 112 is also in communication with a maintenance record server 114 that contains a database of maintenance records for the APC system 100.

APC control computers 150 and 152 are in communication with industrial control devices 170, 172, 174, 176 (170-176) that are located within a process facility 160. APC control computers 150 and 152 communicate with industrial control devices 170-176 via communication device L3 122. Process facility 160 can be a manufacturing plant, chemical plant, crude oil refinery, ore processing plant, or paper manufacturing plant that uses continuous processing to produce one or more materials. In one embodiment, industrial control devices 170-176 can be pumps, motors, meters valves, sensors, gauges, scales and other industrial equipment within process facility 160

Figure 2:
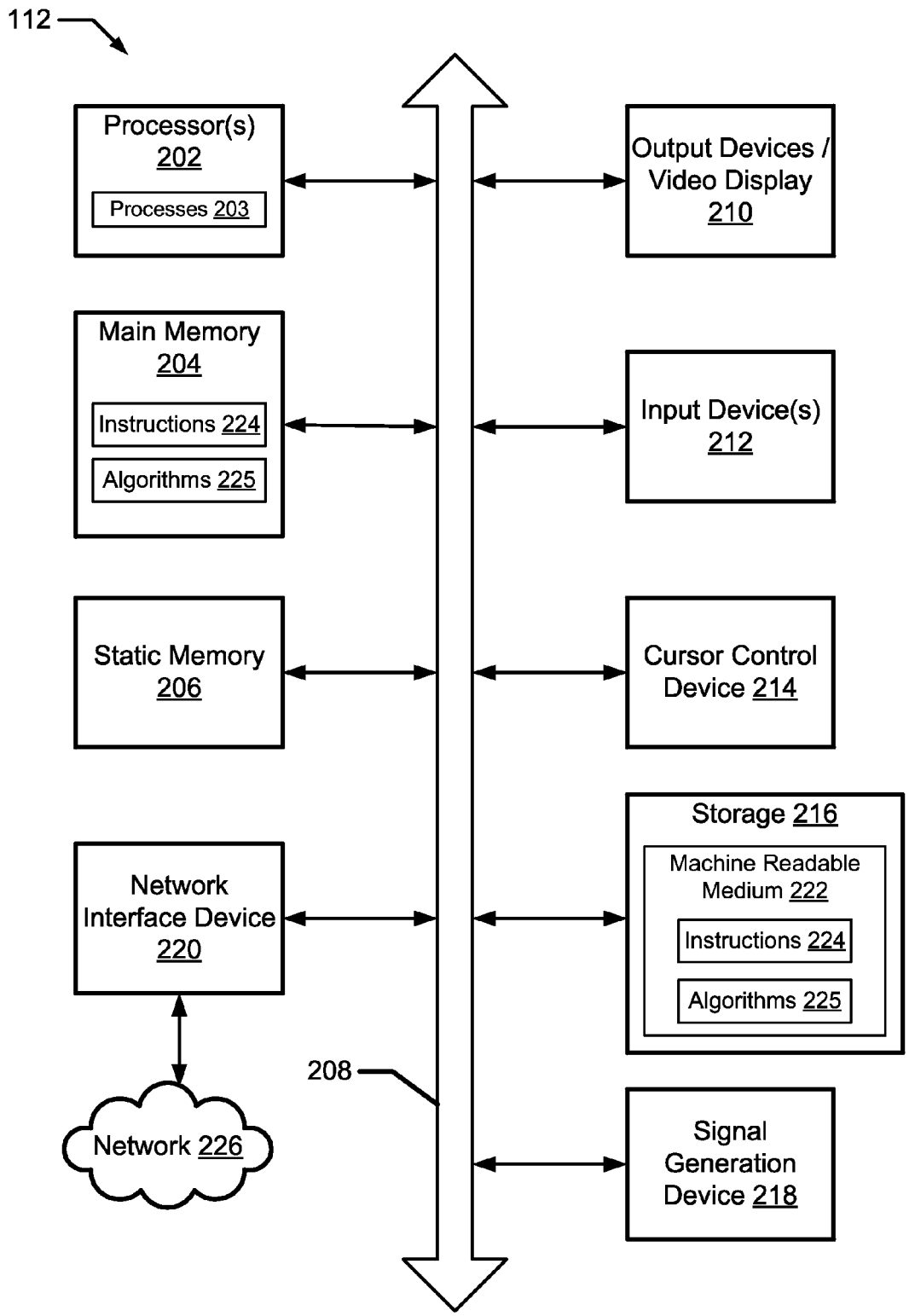
FIG. 2 is a block diagram of an example APC management computer, according to an example embodiment.

FIG. 2 illustrates an example block diagram of APC management computer 112 within which a set of instructions 224 and/or algorithms 225 can be executed causing the APC management computer 112 to perform any one or more of the methods, processes, operations, applications, or methodologies discussed herein. APC management computer 112 includes one or more processors 202 such as a central processing unit (CPU), a graphics processing unit (GPU) or both, a main memory 204 and a static memory 206, which communicate with each other via a system bus 208 which can represent a data bus and an address bus.

Processor 202 can run or execute one or more processes 203. Main memory 204 can store instructions 224 and/or algorithms 225 for execution by processor 202. APC management computer 112 further includes output devices shown as output devices/video display unit 210 and a signal generation device 218 (e.g., a speaker) which are connected to system bus 208. The APC management computer 112 also has input devices such as an alphanumeric input device 212 (e.g., a keyboard) and a cursor control device 214 (e.g., a mouse) that are connected to system bus 208. A network interface device 220 is shown connected to an external communication network 226 to enable communication with the system bus 208.

A storage device 216 such as a hard drive or solid state drive is connected to and is in communication with system bus 208. The storage device 216 includes a machine-readable medium 222 on which is stored one or more sets of software such as instructions 224 and/or algorithms 225 embodying any one or more of the methodologies or functions described herein. The instructions 224 and/or algorithms 225 can also reside, completely or at least partially, within the main memory 204 and/or within the processor 202 during execution thereof by the APC management computer 112. The main memory 204 and the processor 202 also contain machine-readable media. The instructions 224 and/or algorithms 225 can further be transmitted or received over network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the computer system and that cause the computer system to perform any one or more of the methodologies shown in the various embodiments of the present invention. The term "machine-readable medium" shall accordingly be taken to include, but not be limited to, solid-state memories, optical and magnetic media, and carrier wave signals.

Figure 3:
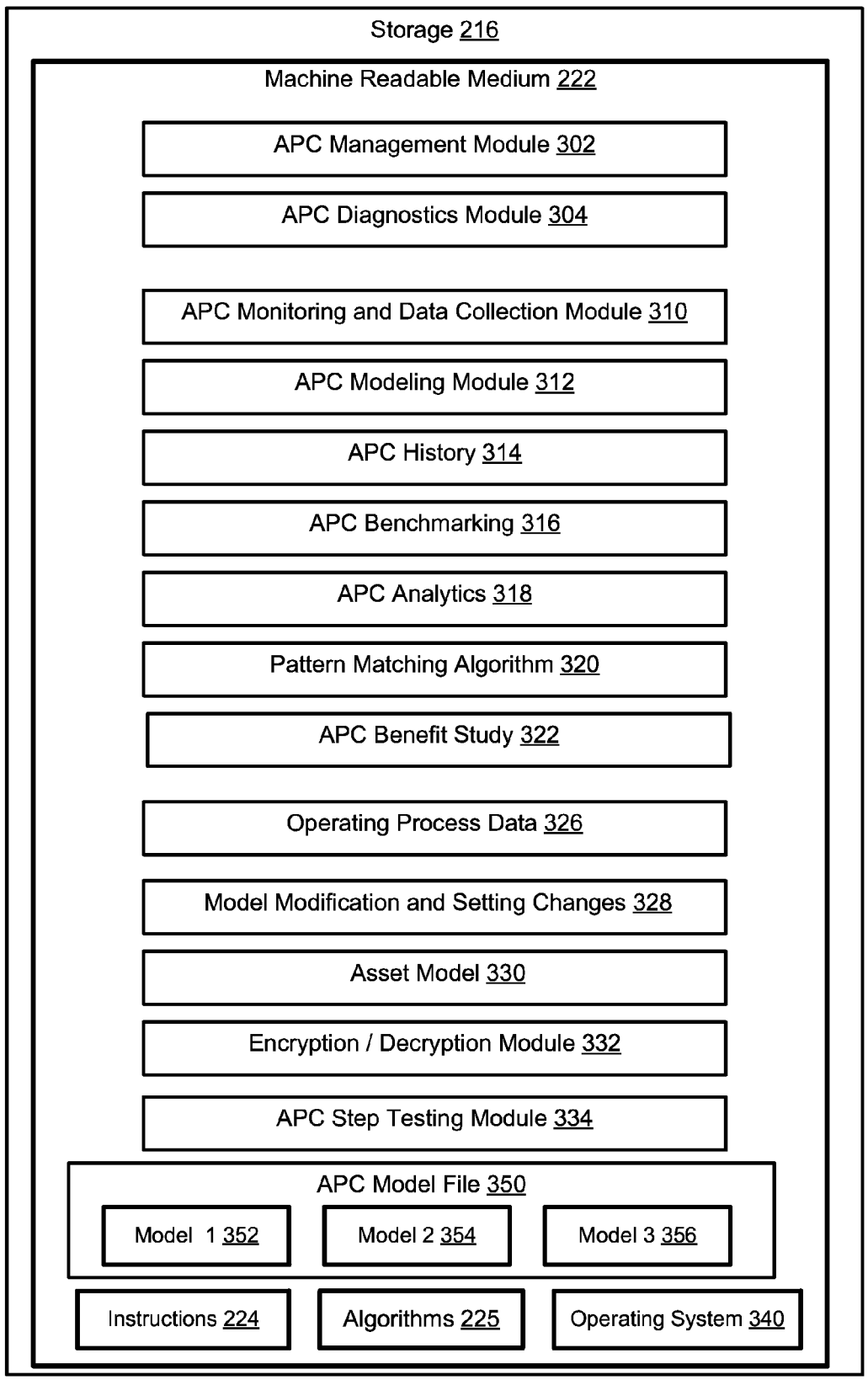
FIG. 3 is an example illustration of contents of a computer-readable storage medium of the APC management computer, according to an example embodiment.

With reference to FIG. 3, example contents of machine-readable medium 222 stored within storage device 216 are shown. Machine-readable medium 222 can store instructions 224 and/or algorithms 225 for execution by processor 202. An operating system (0/S) 340 is also stored in machine-readable medium 222. O/S 340 manages resources and provides common services for APC management computer 112.

Machine-readable medium 222 further includes an APC management module 302 and an APC diagnostics module 304. APC management module 302 is a software program that manages advanced process control functions and operations within APC system 100. APC diagnostics module 304 is a software program that detects and diagnoses problems within APC system 100. APC monitoring and data collection module 310 is a software program that collects and stores operating process data 326 from APC control computers 150 and 152. APC modeling module 312 is a software program that generates process models from operating process data. APC model files 350 store process models such as process model 1 352, process model 2, 354 and process model 3 356 that are generated by APC modeling module 312. APC history file 314 is a database of previous data, models, functions and operations within APC system 100.

Machine-readable medium 222 further includes an APC benchmarking module 316. APC benchmarking module 316 is a software program that analyzes and compares various APC models 352, 354, 356 (352-356). APC analytics module 318 is a software program that analyzes functions and operations within APC system 100. Pattern matching algorithm 320 is an algorithm that matches error conditions detected by APC diagnostics module 304 with maintenance records stored in maintenance record server 114. APC benefit study module 322 is a software program that analyzes the benefits of the operation of APC models 352-356 within APC system 100. Model modification and settings file 328 is database of changes that have occurred over time to the models and settings within APC system 100.

Machine-readable medium 222 also includes an asset model module 330. Asset model module 330 is software program that models the physical assets within APC system 100. Encryption/decryption module 332 is a software program that encrypts and decrypts communications between APC management computer 112 and APC control computers 150, 152 in order to provide secure communications. APC step testing module 334 is a software program that performs an iterative step test on APC system 100 using operating process data 326.

Figure 4:
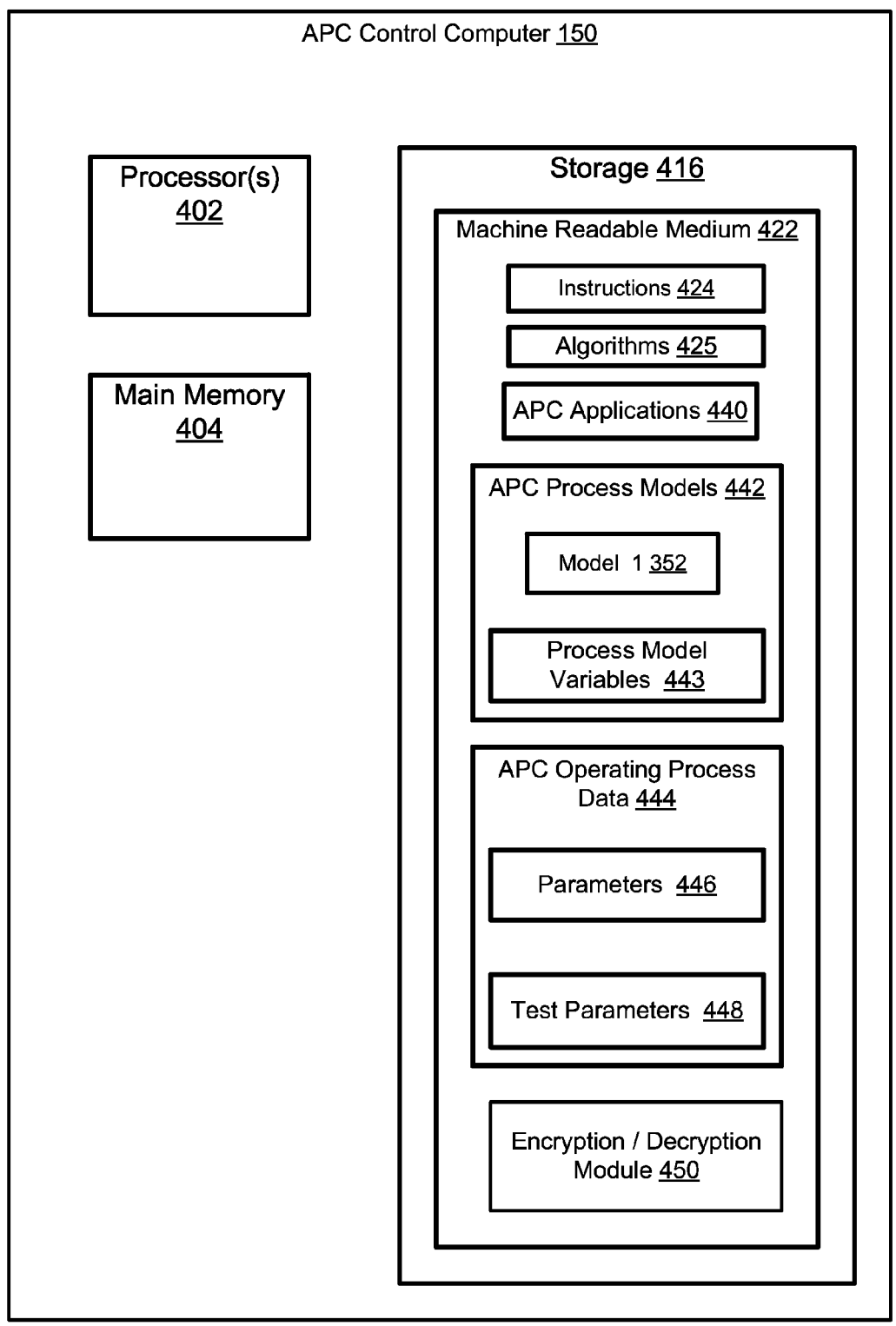
FIG. 4 is a block diagram of an example APC control computer, according to an example embodiment.

FIG. 4 illustrates an example block diagram of an APC control computer shown as APC control computer 150. APC control computer 150 includes one or more processors 402 such as a CPU, a GPU or both, and a main memory 404. A storage device 416 such as a hard drive or solid state drive is connected to and in communication with processor 402. The storage device 416 includes a machine-readable medium 422 on which is stored one or more sets of software such as instructions 424 and/or algorithms 425 embodying any one or more of the methodologies or functions described herein.

Machine-readable medium 422 further stores APC applications 440 which are software application programs that execute on APC control computer 150. APC process models 442 store process models such as process model 1 352 that have been received from APC management computer 112. APC process models 442 further store process model variables (process variables) 443 that are used in process model 1 352. Operating process data 444 includes parameters 446 and test parameters 448. Operating process data 444 is collected during operations within process facility 160. Encryption/decryption module 450 is a software program that encrypts and decrypts communications between APC control computer 150 and APC management computer 112 in order to provide secure communications.

Figure 5:
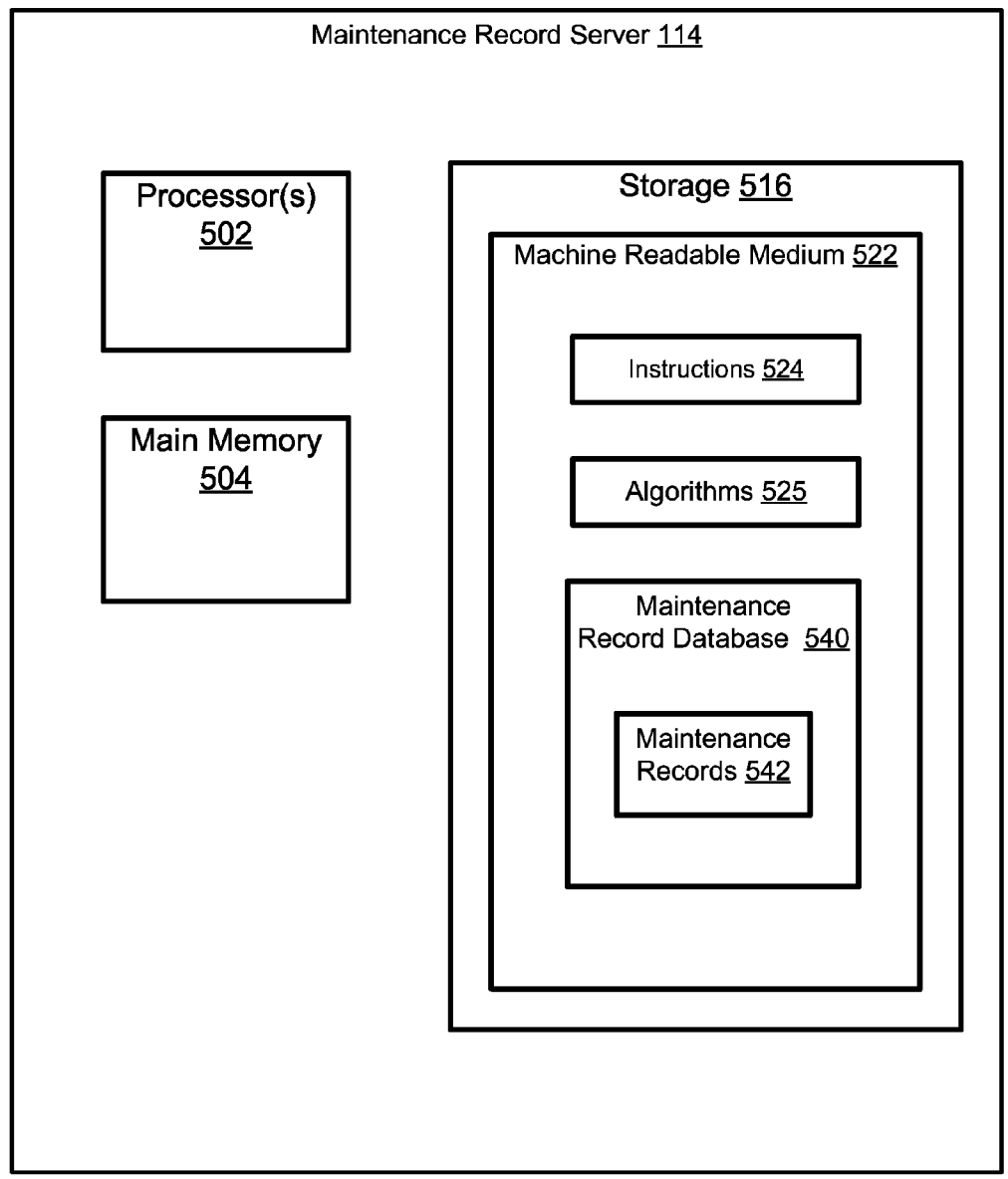
FIG. 5 is a block diagram of an example maintenance record server according to an example embodiment.

Turning to FIG. 5, an example block diagram of maintenance record server 114 is shown. Maintenance record server 114 includes one or more processors 502 such as a CPU, a GPU or both and a main memory 504. A storage device 516 such as a hard drive or solid state drive is connected to and in communication with processor 502. The storage device 516 includes a machine-readable medium 522 on which is stored one or more sets of software such as instructions 524 and/or algorithms 525 embodying any one or more of the methodologies or functions described herein.

Machine-readable medium 522 further stores a maintenance record database 540 that contains maintenance records 542. Maintenance records 542 contain data and information about modifications, repair operations and maintenance performed on equipment within process facility 160.

Figure 6:
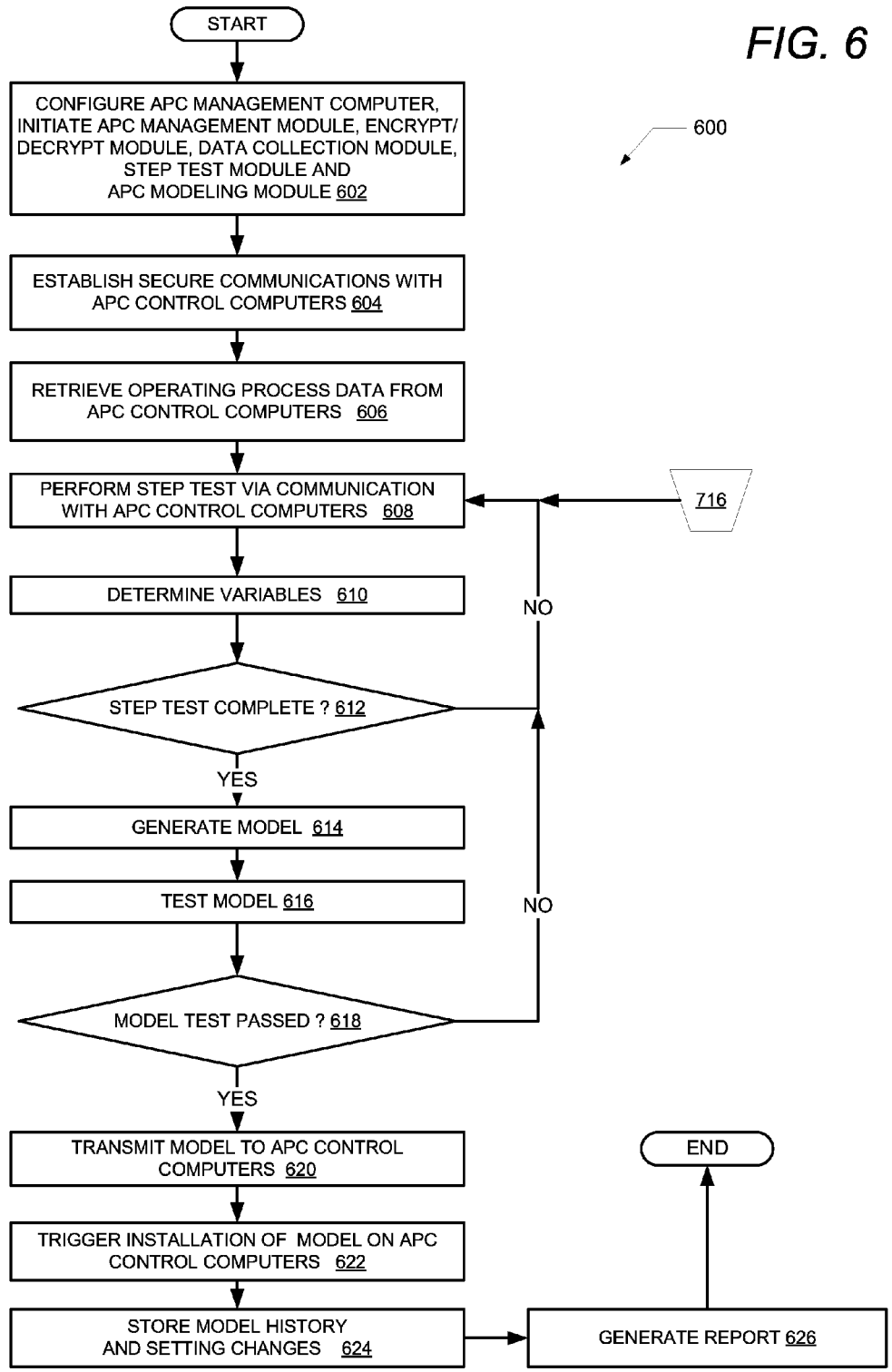
FIG. 6 is a flow chart that shows steps in an example method of step testing and model generation in an APC system, according to an example embodiment.

FIG. 6 is a flow chart showing steps in an example method 600 for step testing and model generation in APC system 100. With reference to FIGS. 1-6, method 600 can be implemented via the execution of instructions 224 and/or algorithms 225 by processor 202 within APC management computer 112 and specifically by the execution of APC management module 302, APC monitoring and data collection module 310, APC modeling module 312, encryption/decryption module 332 and APC step testing module 334 by processor 202. Method 600 begins at the start block and proceeds to block 602. At block 602, processor 202 configures APC management computer 112 and initiates APC management module 302, APC monitoring and data collection module 310, APC modeling module 312, encryption/decryption module 332 and APC step testing module 334.

Processor 202 establishes secure communications with APC control computers 150 and 152 (block 604) and retrieves operating process data 444 from APC control computers 150 and 152 and stores the received operating process data to storage device 216 as operating process data 326 (block 606). At block 608, processor 202 performs an iterative step test on the APC system 100. The iterative step test modifies at least one test parameter 448 of the operating process data 444 and identifies changes to a set of remaining parameters 446 of the operating process data resulting from modification of the test parameter. The test is repeated or iterated for each process parameter or variable. Step testing is used to understand the effects of one process parameter or variable on other process parameters or variables. Step testing can identify interactions between multiple process parameters and variables in an APC system. Step testing can also be used to understand overall process dynamics and assist with tuning of open and closed control loops. In an APC system, step testing changes parameters and variables to determine the effects on all controlled variables and the time-to-reach a steady-state process. The variables are moved in both positive and negative directions from the current operating point to observe the process response. The data collected in the manipulated parameters and variables are fit to algorithms in order to generate a dynamic model that best represents the current process operation around the tested operating conditions.

Processor 202 determines at least one process variable 443 from the iterative step test (block 610). Processor 202 determines if the step testing has been completed (block 612). In response to the step testing not being completed, method 600 returns to block 608 to continue step testing. In response to the step testing being completed, processor 202 generates at least one process model (model 1 352) based on the process variable 443 (block 614). Process 202 generates the process model via execution of APC modeling module 312. The process model 352 is tested (block 616) in order to check for any errors and ensure correct operation of the model. In response to the model test failing, method 600 returns to block 608 to repeat the step testing. In response to the model test passing, processor 202 transmits one or more process models 352-356 to the APC control computer 150 where the models are stored in APC process models 442 for use.

Processor 202 triggers installation of the process models 352-356 on APC control computer 150 (block 622). The installation of process models 352-356 can include causing APC control computer 150 to use models 352-356 in executing APC applications 440. Processor 202 stores any model and setting changes to APC history file 314 (block 624). At block 626, processor 202 generates a report of APC activity and history. Method 600 then ends.

Method 600 allows for a system and method of performing management and diagnostic functions in APC system 100. APC step testing module 334 and APC modeling module 312 perform an iterative step test on operating process data 326, determine process variables 443 from the iterative step test and generate process models 352-356 based on the process variables. The process models are transmitted to APC control computers 150 and 152 for use in process facility 160.

Figure 7:
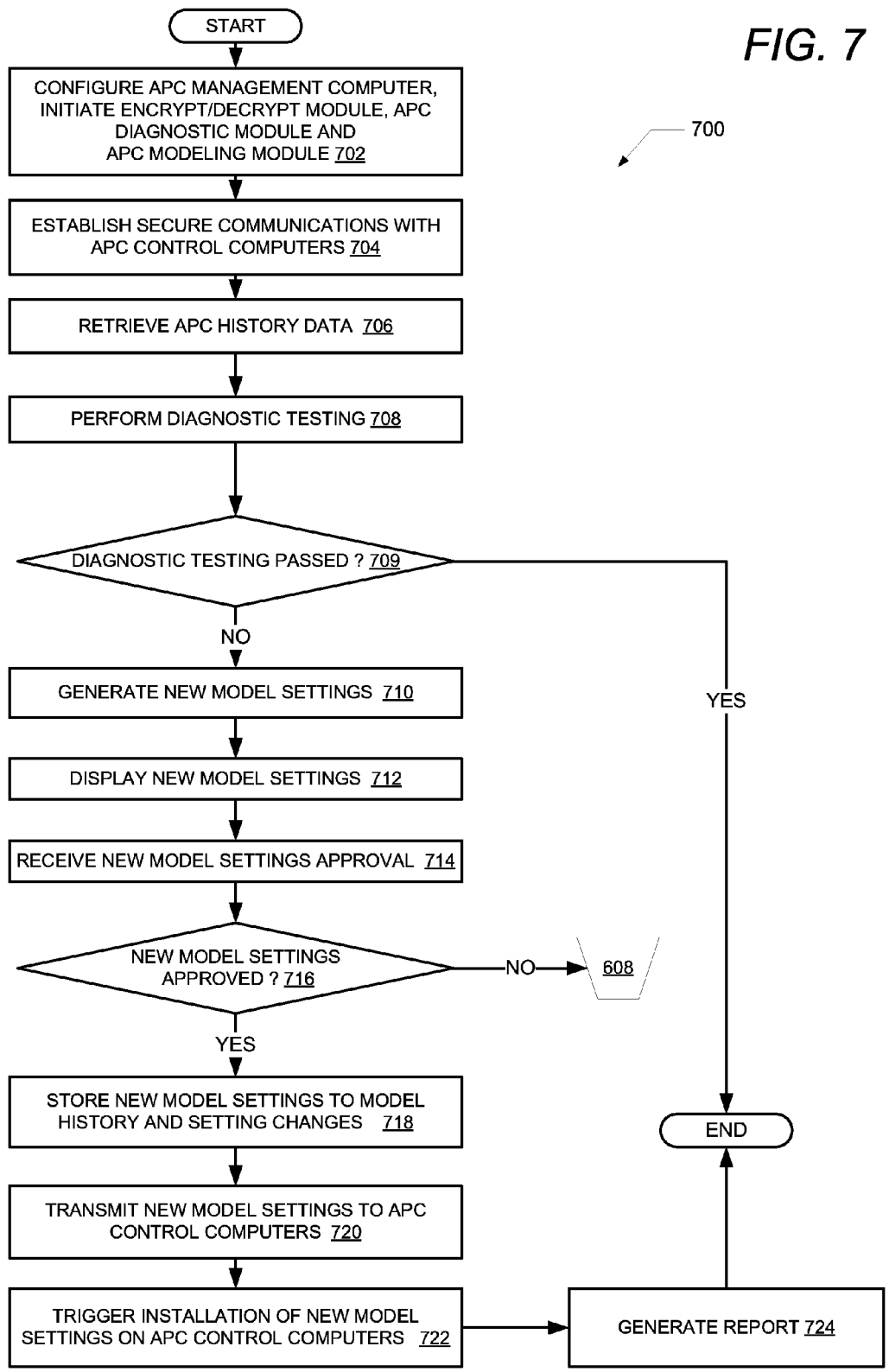
FIG. 7 is a flow chart that shows steps in an example method of diagnostic testing in an APC system, according to an example embodiment.

FIG. 7 is a flow chart showing steps in an example method 700 for diagnostic testing in APC system 100. With reference to FIGS. 1-6, method 700 can be implemented via the execution of instructions 224 and/or algorithms 225 by processor 202 within APC management computer 112 and specifically by the execution of APC diagnostic module 304 and APC modeling module 312 by processor 202. Method 700 begins at the start block and proceeds to block 702. At block 702, processor 202 configures APC management computer 112 and initiates APC diagnostic module 304 and APC modeling module 312.

Processor 202 establishes secure communications with APC control computers 150 and 152 (block 704) and retrieves data from APC history file 314 (block 706). At block 708, processor 202 performs diagnostic testing of the APC models 352-356 using data from the APC history file 314. Processor 202 determines if the APC models 352-356 are acceptable or have passed the diagnostic testing (block 709). In response to the diagnostic testing passing, method 700 ends. In response to the diagnostic testing not passing, processor 202 generates at least one new APC model or APC model setting one or more of APC models 352-356 (block 710).

Processor 202 displays the new model settings on output devices/video display 210 to a process operator or engineer (block 712) and receives input from the process operator or engineer for approval of the new model settings (block 714). Processor 202 determines if the new model settings have been approved by the process operator, technician or engineer (block 716). In response to the new model settings not being approved by the process operator, technician or engineer, method 700 returns to block 608 of method 600 (FIG. 6) to repeat iterative step testing. In response to the new model settings being approved by the process operator, technician or engineer, processor 202 stores the new model settings to model modification and history changes file 328 (block 718). Processor 202 transmits the new models and/or model settings to the APC control computers 150, 152 where the models are stored in APC process models 442 for use (block 720). Processor 202 triggers installation of the new models or model settings on APC control computers 150, 152 (block 722). At block 724, processor 202 generates a report of APC activity and history. Method 700 then ends.

Figure 8:
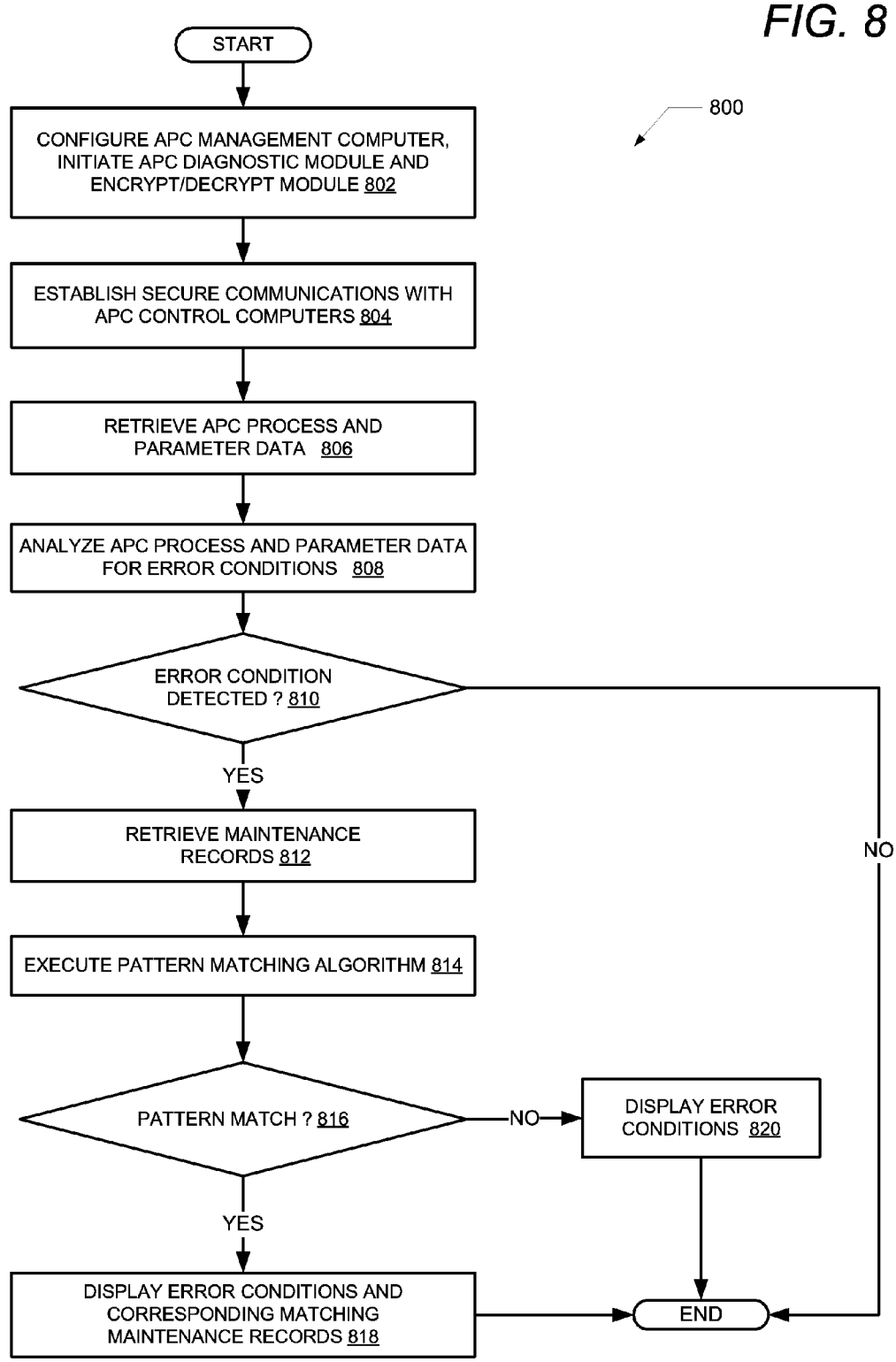
FIG. 8 is a flow chart that shows steps in an example method of matching error conditions with maintenance records in an APC system, according to an example embodiment.

FIG. 8 is a flow chart showing steps in an example method 800 for matching error conditions with maintenance records in APC system 100. With reference to FIGS. 1-6, method 800 can be implemented via the execution of instructions 224 and/or algorithms 225 by processor 202 within APC management computer 112 and specifically by the execution of APC diagnostic module 304 and pattern matching algorithm 320 by processor 202. Method 800 begins at the start block and proceeds to block 802. At block 802, processor 202 configures APC management computer 112 and initiates APC diagnostic module 304, encryption/decryption module 332 and pattern matching algorithm 320.

Processor 202 establishes secure communications with APC control computers 150 and 152 (block 804) and retrieves operating process data 444 from APC control computers 150 and 152 and stores the received operating process data to storage device 216 as operating process data 326 (block 806). At block 808, processor 202 detects or analyzes the operating process data 326 for error conditions associated with a process within process facility 160 that is controlled by APC control computers 150 and 152. Processor 202 determines if any error conditions have been detected (block 810). In response to no error conditions being detected, method 800 ends. In response to error conditions being detected, processor 202 retrieves maintenance records 542 from maintenance record database 540 (block 812) and executes pattern matching algorithm 320 (block 814). The pattern matching algorithm 320 compares the error conditions to the maintenance records 542 to identify error conditions that are correlated with maintenance actions performed within process facility 160.

Processor 202 determines if any error conditions match with the corresponding maintenance records 542 (block 816). In response to no error conditions matching with the corresponding maintenance records, processor 202 displays the error conditions on output devices/video display 210 (block 820). Method 800 then terminates. In response to error conditions matching with the corresponding maintenance records, processor 202 displays the error conditions and the corresponding maintenance records on output devices/video display 210 (block 818). Method 800 then ends.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer-readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method for performing management and diagnostic functions in an advanced process control (APC) system, the method comprising:
providing an APC management computer communicatively coupled by a first communication device to at least one APC control computer, said APC management computer including a first processor connected to a first storage device having a first non-transitory machine-readable storage medium storing a data collection module, an APC diagnostics module, and a step testing module, wherein said APC management computer is programmed to implement said data collection module, said APC diagnostics module and said step testing module causing said APC management computer to execute:
retrieving operating process data from said APC control computer including a plurality of APC history data from an APC history file;
performing an iterative step test on said APC system, wherein said iterative step test modifies at least one test parameter of said operating process data and identifies changes to a set of remaining parameters of said operating process data resulting from modification of said test parameter;
determining at least one process variable from said iterative step test;
generating at least one process model based on said process variable,
transmitting said process model to said APC control computer;
performing diagnostic testing on said APC history data;
generating at least one new model setting based on said diagnostic testing;
displaying said at least one new model setting;
determining if said at least one new model setting has been approved;
in response to determining that said at least one new model setting has been approved:
transmitting said at least one new model setting to said APC control computer, and
triggering said APC control computer to install said at least one new model setting.

2. The method of claim 1, wherein said APC management computer further executes:
testing said process model, and
in response to said process model passing said testing, transmitting said process model to said APC control computer.

3. The method of claim 1, wherein said APC management computer further executes:
testing said process model, and
in response to said process model not passing said testing, repeating said performing said iterative step test using said operating process data.

4. The method of claim 1, wherein said APC management computer further executes:
storing said process model and said at least one new process model setting to said APC history file.

5. The method of claim 1, wherein said first storage device further stores an APC diagnostics module and said APC management computer is programmed to implement said APC diagnostics module causing said APC management computer to execute:
analyzing said operating process data for error conditions associated with a process controlled by said APC control computer;
determining if at least one of said error conditions has occurred;
in response to determining that said error condition has occurred, retrieving a maintenance record database;
executing a pattern matching algorithm;
determining if said error condition matches at least one record in said maintenance record database, and
in response to said error condition matching said at least one record in said maintenance record database, displaying said error condition and said matching at least one record.

6. The method of claim 5, wherein said APC management computer further executes:
in response to said error condition not matching said at least one record in said maintenance record database, displaying said error condition.

7. A computer program product, comprising:
a non-transitory data storage medium that includes program instructions executable by a processor to enable said processor to execute a method of managing and diagnosing an advanced process control (APC) system having an APC management computer, said APC management computer communicatively coupled by a first communication device to at least one APC control computer, said computer program product comprising:
code for retrieving operating process data from said APC control computer and a plurality of APC history data from an APC history file;
code for performing an iterative step test on said APC system, wherein said iterative step test modifies at least one test parameter of said operating process data and identifies changes to a set of remaining parameters of said operating process data resulting from modification of said test parameter;
code for determining at least one process variable from said iterative step test;
code for generating at least one process model based on said process variable;
code for transmitting said process model to said APC control computer;
code for performing a diagnostic testing on said APC history data;
code for generating at least one new process model setting based on said diagnostic testing;
code for displaying said new process model setting;
code for determining if said new process model setting has been approved;
in response to determining that said new process model setting has been approved, code for transmitting said new process model setting to said APC control computer; and
code for triggering said APC control computer to install said new process model setting.

8. The computer program product of claim 7, wherein said computer program product further comprises:
code for testing said process model, and
in response to said process model passing said testing, code for transmitting said process model to said APC control computer.

9. The computer program product of claim 7, wherein said computer program product further comprises:
 code for testing said process model, and
 in response to said process model not passing said testing, code for repeating said performing said iterative step test using said operating process data.

10. The computer program product of claim 7, wherein said computer program product further comprises:
 code for storing said process model and said at least one new model setting to said APC history file.

11. The computer program product of claim 7, wherein said computer program product further comprises:
 code for analyzing said operating process data for error conditions associated with a process controlled by said APC control computer;
 code for determining if at least one of said error conditions has occurred;
 in response to determining that said error condition has occurred, code for retrieving a maintenance record database;
 code for executing a pattern matching algorithm;
 code for determining if said error condition matches at least one record in said maintenance record database; and
 in response to said error condition matching said at least one record in said maintenance record database, code for displaying said error condition and said matching at least one record.

12. The computer program product of claim 11, wherein said computer program product further comprises:
 in response to said error condition not matching said at least one record in said maintenance record database, code for displaying said error condition.

13. A system for performing management and diagnostic functions in an advanced process control (APC) environment, the system comprising:
 an APC management computer communicatively coupled by a first communication device to at least one APC control computer; said APC management computer including a first processor connected to a first storage device having a first non-transitory machine-readable storage medium storing a data collection module, an APC diagnostics module and a step testing module, wherein said APC management computer is programmed to implement said data collection module, said APC diagnostics module and said step testing module causing said APC management computer to:
 retrieve operating process data from said APC control computer including a plurality of APC history data from an APC history file;
 perform an iterative step test on said APC environment, wherein said iterative step test modifies at least one test parameter of said operating process data and identifies changes to a set of remaining parameters of said operating process data resulting from modification of said test parameter;
 determine at least one process variable from said iterative step test;
 generate at least one process model based on said process variable;
 transmit said process model to said APC control computer;
 wherein said first storage device further stores an APC diagnostics module and said APC diagnostics module further causes said APC management computer to:
 perform a diagnostic testing on said APC history data;
 generate at least one new model setting based on said diagnostic testing;
 display said at least one new model setting;
 determine if said at least one new model setting has been approved;
 in response to determining that said at least one new model setting has been approved, transmit said at least one new model setting to said APC control computer, and
 trigger said APC control computer to install said at least one new model setting.

14. The system of claim 13 wherein said data collection module and said step testing module cause further cause said APC management computer to:
 test said process model; and
 in response to said process model passing said test, transmit said process model to said APC control computer.

15. The system of claim 13 wherein said data collection module and said step testing module cause further cause said APC management computer to:
 test said process model, and
 in response to said process model not passing said test, repeating said performing said iterative step test using said operating process data.

16. The system of claim 13 wherein said APC diagnostics module further causes said APC management computer to:
 store said process model and said at least one new model setting to said APC history file.

17. The system of claim 13 wherein said first storage device further stores an APC diagnostics module and said APC diagnostics module further causes said APC management computer to:
 analyze said operating process data for error conditions associated with a process controlled by said APC control computer;
 determine if at least one of said error conditions has occurred;
 in response to determining that said error condition has occurred, retrieve a maintenance record database;
 execute a pattern matching algorithm;
 determine if said error condition matches at least one record in said maintenance record database; and
 in response to said error condition matching said at least one record in said maintenance record database, display said error condition and said matching at least one record.

* * * * *